April 21, 1964     D. E. HESKETT     3,130,155
AUTOMATIC FLOW CONTROL FOR AUTOMATIC WATER SOFTENING SYSTEM
Filed April 4, 1960     2 Sheets-Sheet 1
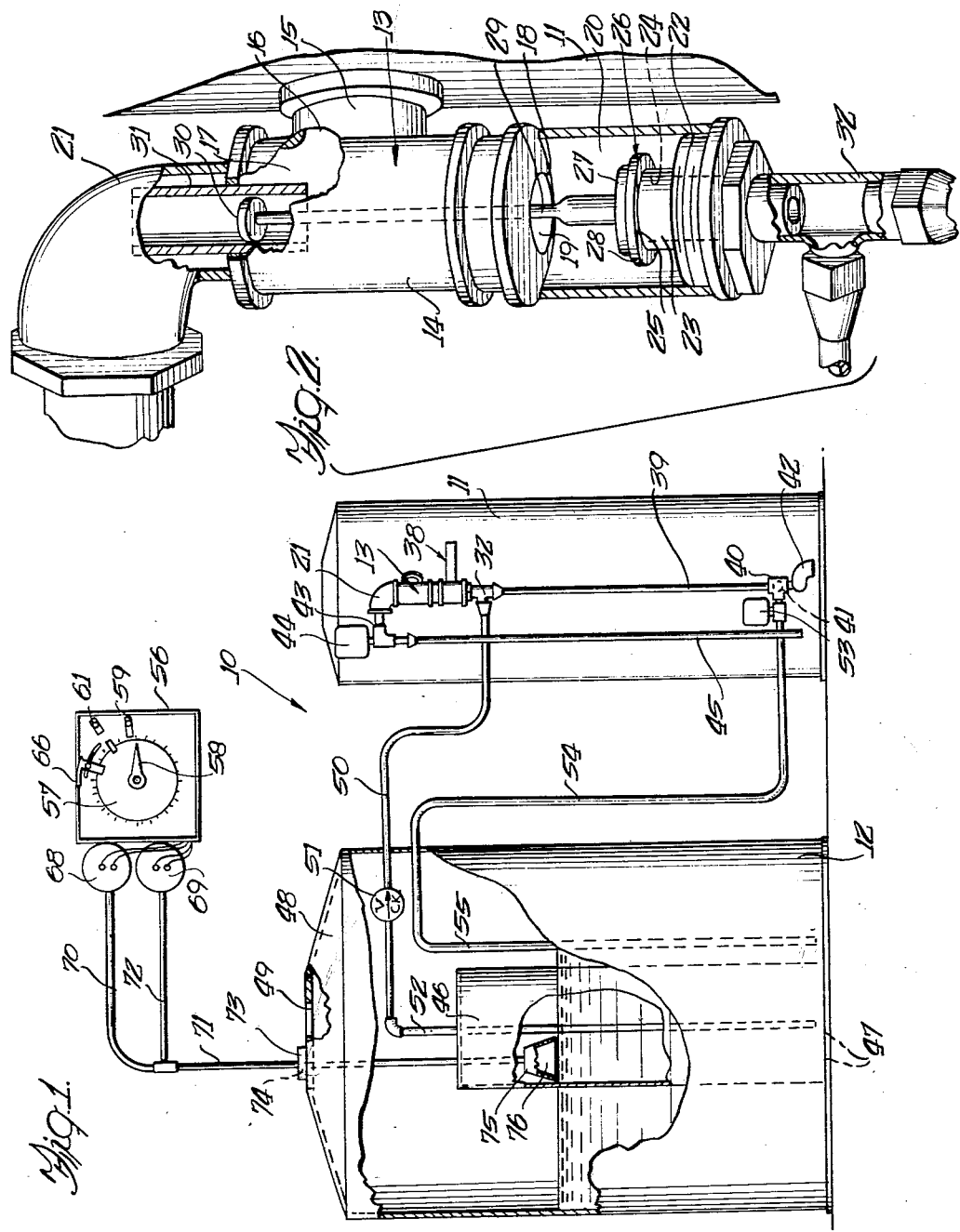
Inventor
Don E. Heskett
Helmuth O. Vogel
Attorney April 21, 1964 D. E. HESKETT 3,130,155
AUTOMATIC FLOW CONTROL FOR AUTOMATIC WATER SOFTENING SYSTEM
Filed April 4, 1960 2 Sheets-Sheet 2
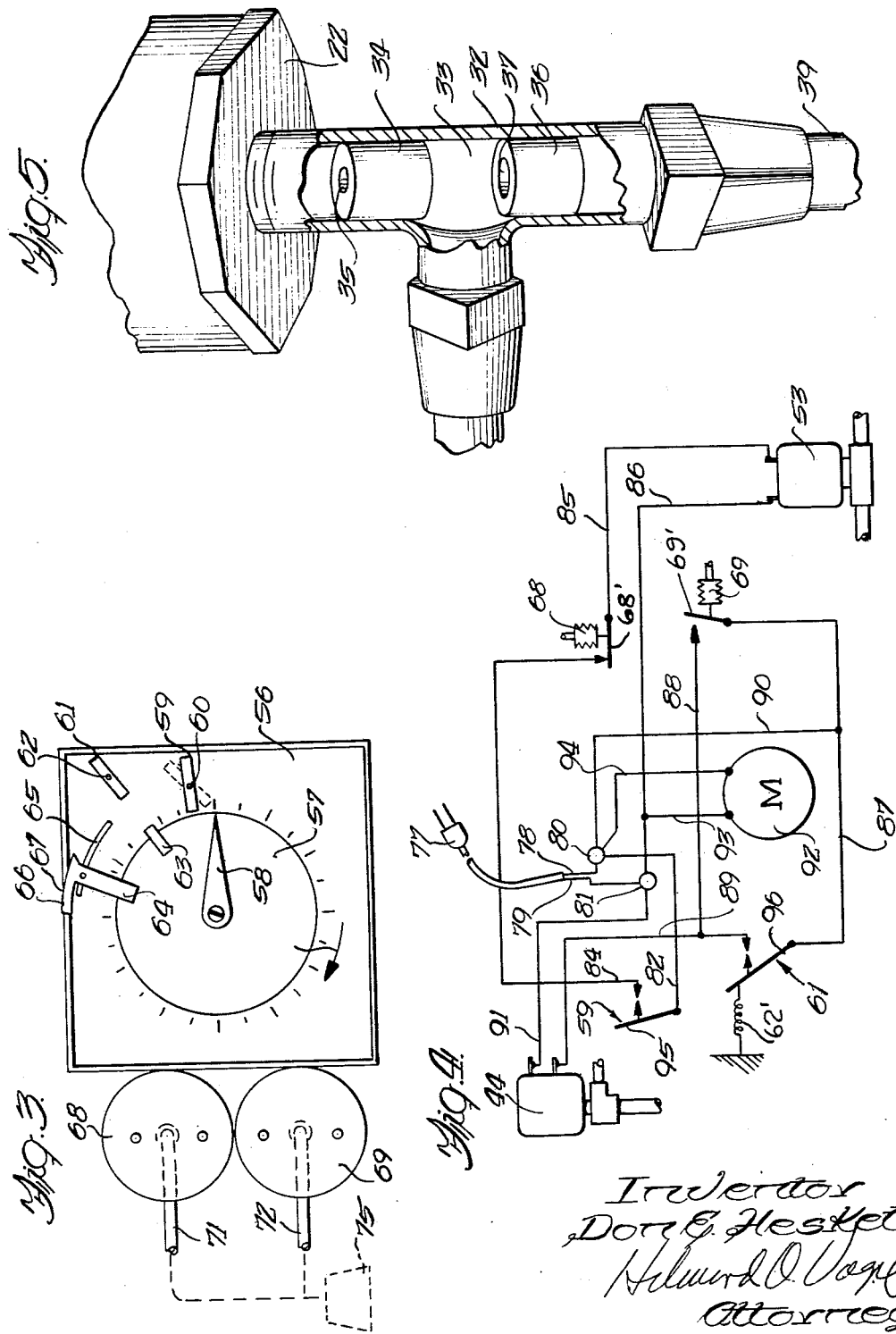
Inventor
Don E. Heskett
Hilmard O. Vogel
Attorney United States Patent Office 3,130,155
Patented Apr. 21, 1964

3,130,155
AUTOMATIC FLOW CONTROL FOR AUTOMATIC WATER SOFTENING SYSTEM
Don E. Heskett, 1 S. 336 Euclid Ave., Villa Park, Ill.
Filed Apr. 4, 1960, Ser. No. 19,793
3 Claims. (Cl. 210—134)

This invention relates to a water softening system. More specifically the invention relates to an automatic water softening system including a brine tank for regenerating the water softener at predetermined intervals.

In the construction of automatic water softener systems a water softener tank and a separate brine tank are usually provided. The brine tank is connected to the water softener by means of a conduit which during a certain time interval empties the brine from the brine tank into the water softener thus providing for proper regeneration. After the regeneration cycle has been finished the brine tank again must be filled with water to provide for additional brine. Generally the conventional softener is provided with means whereby the conduit from the brine tank then directs fresh water from the softener to the brine tank for filling the same. The brine tank also includes a valving arrangement, usually actuated by a float, which when the water lever within the brine tank reaches a certain predetermined height the float shuts off the entrance of water until the next regeneration cycle takes place. The float valves utilized are of course completely immersed in the brine solution and in operation it has been found that the valves become readily corroded, inoperative and clogged so that the water level continues to rise with frequent overflow of the brine tank. The overflow of such a solution can of course cause great damage and therefore this is a very undesirable aspect of an automatic water softener. Various devices have been attempted and have been incorporated in the float valves in order to prevent such overflow or malfunction of the valve. None of these has been practical and thus wherever the float type valves are utilized the danger of overflow exists.

It is a prime object of this invention to provide an improved water softening system of the automatic type wherein the brine tank is completely insured against the possibility of overflow of the brine solution.

Another object is the provision of an automatic water softening system including a brine tank wherein the brine tank is completely devoid of a float valve and includes a novel system for refilling the brine tank and assuring the proper function of the same without possibilities of overflow.

Still another object of the invention is to provide an improved water softening system wherein provision is made for filling a brine tank a short time prior to the regeneration of the tank so that the water is maintained within the brine solution only sufficiently long to dissolve the needed salt and thus will have little tendency to damage the interior parts of the tank.

A still further object is the provision of an improved water softening system including an arrangement whereby a brine tank may be automatically filled with clear soft water emanating from the water softener of the system.

A more specific object is the provision of an improved water softening system including a conduit connection between the brine tank and the water softener tank which is electrically controlled to direct clear water to the tank and further including a pressure responsive electrical switch ararngement which upon a predetermined pressure within the tank actuates a valve which shuts off the incoming water to the brine tank and thus prevents any possibility of overflow of the brine tank. These and other objects of the invention will become more readily apparent from a reading of the description when examined in connection with the accompanying sheet of drawings.

In the drawings:
FIGURE 1 is a side elevational view of an improved water softener system having portions of a brine tank broken away to illustrate the interior parts of the invention;
FIGURE 2 is a perspective view of a control valve for a water softener tank the said valve having portions broken away to more aptly disclose the structure.
FIGURE 3 is a front elevational view of a clock and timing arrangement for the water softening system;
FIGURE 4 is a wiring diagram showing the electrical circuit for the operation of an improved water softening system, and;
FIGURE 5 is an enlarged view of a suction device connected to a control valve for causing the flow of brine to the water softener tank during a certain stage of the operation of the system.

Referring now particularly to FIGURES 1 and 2, a water softening system is generally referred to by the reference character 10. The water softening system 10 comprises a water softener tank 11 and a brine tank 12. A control valve 13, as best shown in FIGURES 1 and 2, is connected to the side of the water softener tank and includes a body 14. The body 14 has a tubular connection or fitting 15 connected to the softener tank 11 which is provided with a passage 16 communicating with an upper chamber 17. The body further includes an interior valve seat 18 having an opening 19 adapted to provide for communication with the upper chamber 17, and is also adapted to provide for communication with a lower chamber 20. An elbow fitting 21 is connected to the upper part of the body 14 and is adapted to communicate with the chamber 17. The lower chamber is closed by means of a lower fitting 22 having a tubular extension 23 projecting upwardly into the chamber 20. The extension 23 includes a bore 24 having at its upper end a valve seat 25. A valve member 26 is adapted to seat on the valve seat 25 for closing the same and a valve element 27 is adapted to seat on the valve seat 18 for closing the opening 19. The valve 26 is defined by an annular poppet type member designated at 28. A stem 29 is connected to the valve member 26 and extends vertically through the opening 19 into the chamber 17. A piston 30 is secured to the end of the stem 29 the said piston being confined within a cylindrical guide 31 which is suitably secured within the fitting 21.

The lower fitting 22 has a T-connection 32 connected thereto. The T-connection 32 has a T-passage 33 in which an upper cylindrical plug 34 is secured the said plug 34 having a vertically extending small bore 35. The T-passage 33 also is provided with a similar plug 36 having a vertically extending enlarged bore 37. Referring now to FIGURE 1 an inlet water connection 38 is suitably connected to the valve 13 to deliver water to the chamber 20 from a suitable main or water pump. A conduit 39 is connected to the T-connection 32 and as shown in FIGURE 1 extends downwardly where it is connected to a T-connection 40 having a stem connection 41 communicating with the interior of the softener tank 11. The soft water outlet is designated at 42 which of course leads to the water system of the house. A solenoid valve 33 including a solenoid 34 is connected to the elbow 21 and has connected thereto a drain line 45.

Referring now to FIGURE 1 the brine tank 12 includes a tubular well 46 having at its lower end 47 openings. The brine tank 12 is provided with a suitable top 48 having an opening 49. A brine conduit is indicated at 50 and is suitably connected to the T-connection 32. The brine conduit 50 has provided therein a check valve 51 and also is connected to a vertical conduit 52 extending downwardly into the well 46. A solenoid valve is suitably connected to the T-connection 40 and to an inlet water line 54 having a vertical portion 55 extending downwardly into the brine tank. A clock is designated at 56 as shown in FIGURE 3 the said clock being of any conventional type and including a timer wheel 57. The timer wheel includes a setting pointer 58. A micro switch 59 is pivoted as indicated at 60 and a micro switch 61 is pivoted as indicated at 62. A cog 63 is positioned to actuate and pivot the micro switch 59 during movement of the timer wheel 57 to a position wherein it engages the micro switch. A cog 64 is positioned outwardly of the cog 63 and is positioned to engage the micro switch 61 to pivot the same the said cog having an adjustable finger 65 and a cam 66 including a cam surface 67. As the timer wheel 57 moves, the cog 63 pivots the micro switch 59, and just prior to engagement of the cam surface 67 with the switch 61 the finger 65 returns the micro switch 59 to its orignal position. Thereupon the cam surface 67 engages the micro switch 61 to pivot the same until the cam surface 67 is passed the micro switch whereupon the micro switch 61 is returned by means of a suitable spring as indicated in FIGURE 4 to its original position.

Pressure responsive switches 68 and 69 are suitably connected to the clock 56. A pressure responsive line 70 is connected to a vertical extension 71 which also is in communication with a pressure responsive line 72. The line 71 extends through a rubber grommet 73 having an opening 74 and downwardly into the well 46. A bell 75 is connected into the end of the line 71 and has a chamber 76 which communicates with the line 71.

Referring now to the wiring diagram of FIGURE 4 a plug 77 is connected to power lines 78 and 79 which in turn are respectively connected to terminals 80 and 81. A conductor 82 is connected to the terminal 80 and is connected to one side of the micro switch 59. The micro switch 59 includes a switch arm 95 having a suitable contact which in turn is adapted to engage a contact on a conductor 84 leading to one side of the pressure responsive switch 68. A conductor 85 leads to the other side of the pressure responsive switch 68 and leads to one side of the solenoid valve 53. A conductor 86 leads to the other side of the solenoid 53 and is connected to the terminal 81.

The micro switch 61 includes a switch 96 which is opened by means of a spring 62' as indicated. A conductor 87 is connected to the arm 96 the said conductor leading to one side of a pressure responsive switch 69. A conductor 88 includes a suitable contact adapted to be engaged by a contact on the pressure responsive switch 69. The conductor 88 leads to a conductor 89 leading to one side of the solenoid valve 44. A conductor 90 leads to the terminal 80. A conductor 91 leads to the other side of the solenoid 44 and to the terminal 81.

A timing motor is designated at 92 and is connected at one side to a conductor 93 leading to the line 86. The other side of the motor 92 is connected by means of a conductor 94 to the terminal 80.

*The Operation*

In the operation water from a suitable water main or water supply enters through the conduit 38 into the chamber 20 and thereupon enters through the opening 19 into the chamber 17 and into the tank 11. The drain line 45 at this point is closed by means of the solenoid 44 and valve 43. The valve seat 25 is closed by means of the valve 26. Soft water may continue to flow from the connection 42 to the house supply.

The clock 56 has its timer wheel 57, which is moved by means of the motor 92, set to regenerate at a certain time. This regenerating time may be set to conform to the amount of water that is utilized since in some cases more frequent regeneration than in others must take place. The timer wheel 57 therefore is set to provide for regeneration at a certain interval. As it is moving in a clockwise direction the cog 63 engages the micro switch 59 to pivot the same and to close the contacts whereupon the circuit, conductors 84, 82, 85 and 86 to the solenoid valve 53 are completed and the solenoid valve 53 is opened whereupon clear soft water flows from the connection 41 through the lines 54 and 55 to the brine tank thereby raising the level of water in the brine tank. This operation may be several hours before the regeneration cycle takes place. The water now rises in the interior of the brine tank and beyond the lower edge of the bell 75 whereupon air in the chamber 76 is compressed and when a predetermined level is reached the compression of air actuates the switch 68 through the line 70 whereupon the diaphragm of the switch 68 opens the contact arm 68' thus opening the circuit whereupon the solenoid valve 53 is immediately moved to a closed position and the water level ceases to rise in the brine tank. The proper water level has now been achieved.

The timer wheel 57 is of course rotating and prior to the engagement of the cam surface 67 with the micro switch 61 the adjustable finger 65 resets the micro switch 59 by engaging the same and pivoting the same about its pivot 60. The cog 64 is positioned upwardly of the cog 63 so as not to interfere with the micro switch 59 but to engage and actuate the micro switch 61. As the cog moves the cam surface 67 engages the micro switch 61 to pivot the same about its pivot 62 whereupon against the action of the spring 62' the arm 96 is closed and the contact on the arm 96 is closed with a contact on the conductor 89. The conductor 89 now is connected with the conductor 87, conductor 90 and the circuit is completed by the conductor 91 connected to the terminal 81. Regeneration may now take place and this is accomplished as follows: The solenoid valve 44 to the drain 45 now opens and water rushing into the chamber 17 moves the piston 30 upwardly in the guide 31 thereupon opening the valve seat 25 and the valve 27 closes the seat 18 whereupon the water from the tank 11 enters into passage 16 and through the chamber 17 upwardly through the guide 31, around the piston 30 through the fitting 21 and to the drain by means of the drain conduit 45. Water from the inlet 38 now courses downwardly through the T-connection 32 and into the tank 11 by means of the connection 41. By virtue of the small bore 35 and large bore 37 relation in the fitting 32 a Venturi effect is set up causing a suction in the line 50 whereupon brine from the brine tank 12 is delivered to the tank 11 to complete the regenerating cycle. The check valve 51 is one way in the direction of the arrow and thus the line 50 is used only for brine. Thus the regeneration cycle has been described whereby brine is delivered to the tank 11. After the regeneration cycle is completed the cam surface 67 has traveled out of engagement with the micro switch 61 the spring 62' opens the switch arm 96 and regeneration is completed. The cycle can then again be effected at the proper time.

The pressure responsive switch 69 performs a definite function. This pressure responsive switch which like the switch 68 may be of the conventional bellows type is set to be responsive to a higher pressure and therefore will operate only at a higher compression within the bell 75. Thus if for instance the pressure responsive switch 68 ceases to function and water continues to raise in the chamber 76 the pressure responsive switch 69 is then actuated to close the circuit since the switch arm 69' is then closed and the circuit 88, 90, 89 and 91 is completed so that the regeneration takes place until the level within the bell chamber 76 again lowers to the proper point whereupon regeneration ceases. In other words the regenerating cycle at this point is merely to prevent the continued overflow so that brine is removed from the tank 12 during the overflow condition. As soon as the predetermined level is again reached the regeneration cycle is automatically cut off since the pressure responsive switch 69 then again opens the circuit and the circuit is placed in its original position.

It can thus be seen that the objects of the invention has been fully achieved. A few hours or so before regeneration as desired, soft water from the softener system can be delivered to the brine tank to fill the same with brine which then is removed by the regenerating cycle. Thus no float valve of any type is necessary within the brine tank which could become clogged or which could become inoperative. The proper level within the brine tank is guaranteed by means of two pressure responsive switches which in one case closes the entrance of soft water to the system and in an overflow condition causes a regeneration to take place momentarily until the proper level is again reached in the brine tank.

Since no valves are necessary in the brine tank, no malfunction can occur and the interior of the tank may be kept free of brine during inactivity and brine can be made by the entrance of fresh water at such a time as desired prior to the regeneration cycle.

Thus the objects of the invention has been fully achieved and it must be understood that changes and modifications may be made without departing from the spirit of the invention nor from the scope therewith defined in the appended claims.

What is claimed is:

1. A water softening system comprising,
   (a) a softener tank and a brine tank,
   (b) a first suction conduit connected to said brine tank and said softener tank,
   (c) a first electrically controlled valve connected to said softener tank to communicate therewith,
   (d) a drain line connected to said first valve,
   (e) an inlet connection connected to said first valve,
   (f) and means on said valve connected to said first suction conduit to provide a vacuum therein for permitting the flow of brine from said brine tank through said suction conduit to said softener tank during an open position of said valve,
   (g) a water connection on said softener tank,
   (h) a second conduit connected to said water connection and said brine tank,
   (i) a second electrically controlled valve connected to said second conduit during an open position to provide for the flow of water from said water connection to said brine tank,
   (j) timing means connected to said first and second valves for opening said valves at predetermined intervals,
   (k) a first pressure responsive switch connected to said first electrically controlled valve,
   (l) a second pressure responsive switch connected to said second valve,
   (m) said second switch operating at a lower pressure than said first switch,
   (n) means providing communication with said switches and said brine tank comprising,
   (o) a pressure chamber having a gaseous fluid communicating with the brine tank and said gaseous fluid being in pressure sensitive relation with the water in said brine tank,
   (p) a pressure line providing communication between said pressure chamber and said pressure responsive switches whereby during a rise of water within said brine tank to a certain level said gaseous fluid is directly responsive to said rise and said second pressure responsive switch is actuated to close said second valve to shut off the flow of water to said brine tank,
   (q) said first switch being operable during a further rise of water in the brine tank to actuate said first valve to provide for the flow of brine to said softener tank when a certain predetermined level is reached in said brine tank.

2. A water softening system comprising,
   (a) a softener tank and a brine tank,
   (b) a first suction conduit connected to said brine tank and said softener tank,
   (c) a first electrically controlled valve connected to said softener tank to communicate therewith,
   (d) a drain line connected to said first valve,
   (e) an inlet connection connected to said first valve,
   (f) and means on said valve connected to said first suction conduit to provide a vacuum therein for permitting the flow of brine from said brine tank through said suction conduit to said softener tank during an open position of said valve,
   (g) a water connection on said softener tank,
   (h) a second conduit connected to said water connection and said brine tank,
   (i) a second electrically controlled valve connected to said second conduit during an open position to provide for the flow of water from said water connection to said brine tank,
   (j) means connected to said first and second valves for opening said valves at predetermined intervals,
   (k) a first pressure responsive switch connected to said first electrically controlled valve,
   (l) a second pressure responsive switch connected to said second valve,
   (m) said second switch operating at a lower pressure than said first switch,
   (n) means providing communication with said switches and said brine tank comprising,
   (o) a pressure chamber having a gaseous fluid communicating with the brine tank and said gaseous fluid being in pressure sensitive relation with the water in said brine tank,
   (p) and means providing communication between said pressure chamber and said pressure responsive switches whereby during a rise of water within said brine tank to a certain level said gaseous fluid is directly responsive to said rise and said second pressure responsive switch is actuated to close said second valve to shut off the flow of water to said brine tank,
   (q) said first switch being operable during a further rise of water in the brine tank to actuate said first valve to provide for the flow of brine to said softener tank when a certain predetermined level is reached in said brine tank.

3. A water softening system comprising,
   (a) a softener tank and a brine tank,
   (b) a first suction conduit connected to said brine tank and said softener tank,
   (c) a first electrically controlled valve connected to said softener tank to communicate therewith,
   (d) a drain line connected to said first valve,
   (e) an inlet connection connected to said first valve,
   (f) and means on said valve connected to said first suction conduit to provide a vacuum therein for permitting the flow of brine from said brine tank through said first suction conduit to said softener tank during an open position of said valve,
   (g) a water connection on said softener tank,
   (h) a second conduit connected to said water connection and said brine tank,
   (i) a second electrically controlled valve connected to said second conduit during an open position to provide for the flow of water from said water connection to said brine tank,
   (j) means connected to said first and second valves for opening said valves at predetermined timed intervals,
   (k) a pressure responsive switch connected to said second electrically controlled valve,
   (l) a pressure chamber having a gaseous fluid communicating with said brine tank and said gaseous fluid being in pressure sensitive relation with the water in said brine tank,
   (m) and means providing communication between said pressure chamber and said pressure responsive switch whereby during a rise of water within said brine tank to a certain level, said gaseous fluid is responsive to said rise and said second pressure responsive switch is actuated to close said valve to shut off water flow to said brine tank.

References Cited in the file of this patent

UNITED STATES PATENTS

| | | |
|---|---|---|
| 675,677 | Sanford | June 4, 1901 |
| 1,726,749 | Mayo | Sept. 3, 1929 |
| 2,265,225 | Clark | Dec. 9, 1941 |
| 2,660,193 | Hanney | Nov. 23, 1953 |
| 2,715,098 | Whitlock | Aug. 9, 1955 |
| 2,751,347 | Miller | June 19, 1956 |
| 2,855,944 | Albin | Oct. 14, 1958 |
| 2,910,999 | Kimberly | Nov. 3, 1959 |

FOREIGN PATENTS

| | | |
|---|---|---|
| 231,817 | Great Britain | Apr. 30, 1925 |